US006999232B2

(12) United States Patent
Peterson et al.

(10) Patent No.: US 6,999,232 B2
(45) Date of Patent: Feb. 14, 2006

(54) REAR PROJECTION DISPLAY SYSTEM

(75) Inventors: Mark Peterson, Lake Oswego, OR (US); Dave Slobodin, Lake Oswego, OR (US); Jeff Gohman, Hillsboro, OR (US); Serge Bierhuizen, Wilsonville, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/729,103

(22) Filed: Dec. 5, 2003

(65) Prior Publication Data
US 2004/0114230 A1 Jun. 17, 2004

Related U.S. Application Data

(63) Continuation of application No. 09/982,312, filed on Oct. 17, 2001.

(51) Int. Cl.
G03B 21/56 (2006.01)
G03B 21/60 (2006.01)

(52) U.S. Cl. ............... 359/460; 359/449; 359/456; 359/459

(58) Field of Classification Search ............... 359/460, 359/449, 453, 456, 459
See application file for complete search history.

(56) References Cited

U.S. PATENT DOCUMENTS

| 4,066,332 A | * | 1/1978 | Kato et al. ............... 359/453 |
| 4,439,027 A | | 3/1984 | Shioda et al. ............ 353/77 |
| 4,729,631 A | * | 3/1988 | Takahashi et al. ........ 359/456 |
| 4,963,016 A | | 10/1990 | Heijnemans et al. ..... 353/74 |
| 5,111,337 A | | 5/1992 | Martinez .................. 359/443 |
| 6,276,802 B1 | | 8/2001 | Naito ........................ 353/74 |
| 6,728,032 B2 | * | 4/2004 | Peterson et al. .......... 359/460 |

FOREIGN PATENT DOCUMENTS

JP 11-305337 11/1999

* cited by examiner

Primary Examiner—W. B. Perkey
Assistant Examiner—Magda Cruz
(74) Attorney, Agent, or Firm—Alleman Hall McCoy Russell & Tuttle LLP

(57) ABSTRACT

A rear projection display system is disclosed. The display system includes an image source for projecting an image, a rear reflector, and a screen configured to display the projected image. The screen includes a plurality of reflective elements configured to angularly discriminate light without regard to polarity by reflecting light incident on the screen from a first angle toward the rear reflector, and to allow light incident on the screen from a second angle to be transmitted through the screen for display.

25 Claims, 3 Drawing Sheets

REAR PROJECTION DISPLAY SYSTEM

CROSS-REFERENCE TO RELATED APPLICATION

This application is a continuation of and claims priority to U.S. patent application Ser. No. 09/982,312, filed Oct. 17, 2001, which is hereby incorporated by reference in it entirety.

TECHNICAL FIELD

The present disclosure relates to a rear projection display system. More particularly, the disclosure provides a rear projection display system with an angularly discriminating screen that selectively reflects or transmits incident light depending upon the angle of incidence of the light.

BACKGROUND

Rear projection display systems are perhaps the most popular type of large-screen display system available for personal use. These systems have long been used in applications where a self-contained, large-screen display is desired, such as for large-screen television systems. Rear projection display systems generally are available with much larger screen sizes than cathode ray tube (CRT) display systems due to limitations inherent in the manufacture of large cathode ray tubes. More recently, rear projection display systems have also found increased popularity for use in smaller applications, such as monitors. This is at least in part because a rear projection display system will generally have a lesser depth than a CRT monitor of a comparable screen size, and thus have a smaller footprint on a desk or floor.

Rear projection display systems include many individual components that cooperate to display an image for a viewer. For example, a rear projection display system typically includes a body or cabinet with a front side that includes a translucent screen, an image source disposed within the casing, and an optical system. The image source, typically a CRT, a liquid crystal display (LCD), or a digital micromirror device (DMD), produces the image for projection. The optical system includes a plurality of mirrors and lenses configured to direct and focus the image onto the screen.

While many different mirror and lens configurations may be used, all rear projection display systems have a large rear mirror, positioned within the cabinet approximately opposite the screen, off of which light from the image source is reflected toward the screen. Rear projection display systems also often include a smaller front mirror positioned beneath the screen to reflect light from the image source toward the rear mirror. In this arrangement, light first is reflected diagonally upward off of the front mirror toward the back mirror, and then off the back mirror for transmission through the screen. Reflecting the light off of the mirrors increases the path length of the light, thus allowing the projection of a larger image without a corresponding large increase in cabinet depth. A CRT-source rear projection display system may have a depth-to-diagonal ratio (the ratio of cabinet depth to screen diagonal) of as low as about 1:1.2. A LCD- or DMD-source display system may have an even lower ratio, typically approximately 1:2.

Although rear projection display systems offer advantages over other types of displays, they also have some drawbacks. For instance, even with the relatively low depth ratios used in current rear projection display systems, these systems may still be quite heavy. As an example, a system with a 50" screen diagonal may weigh 200 pounds or more. Furthermore, systems with large screen diagonals may still have a significant depth, and thus occupy an undesirable amount of space in a room.

One possible solution to these problems is to reduce the depth of the cabinet, which reduces both the size and the weight of the display system. Reducing the cabinet depth, however, requires the image source and optics to be reconfigured to compensate for the new cabinet geometry. One way to compensate for reduced cabinet depth is to change the angle of the image source to project the image more vertically upward toward the front mirror. However, in this configuration, the front mirror may need to be larger to reflect the entire cone of light emitted by the light source. Making the front mirror larger may cause the front mirror to obscure partially the path of light between the rear mirror and the lower portion of the screen, and thus harm system performance.

Another way to compensate for reduced cabinet depth is described in Japanese Patent No. JP 11-305337. This solution involves utilizing a screen that reflects light of one polarity but transmits light of the other polarity. Polarized light from the image source is first reflected off of the screen toward a polarization-rotating rear mirror, and then reflected off the rear mirror, which rotates the polarization 90 degrees so that the light can pass through the screen. This system offers the advantage that the small front mirror is omitted, and therefore does not block the screen. However, the use of polarized light lowers the intensity of the projected image by 50% compared to non-polarized light. Thus, the system must use much more power to project an image of the same intensity as one projected with non-polarized light, or otherwise suffer from a low-intensity image.

SUMMARY

A rear projection display system, including an image source for projecting an image, a rear reflective surface, and a screen configured to display the image, is disclosed. The screen includes a plurality of reflective elements configured to angularly discriminate light without regard to polarity by reflecting light incident on the screen from a first angle toward the rear reflective surface, and to allow light incident on the screen from a second angle to be transmitted through the screen.

DETAILED DESCRIPTION OF THE PREFERRED EMBODIMENTS

Figure 1:
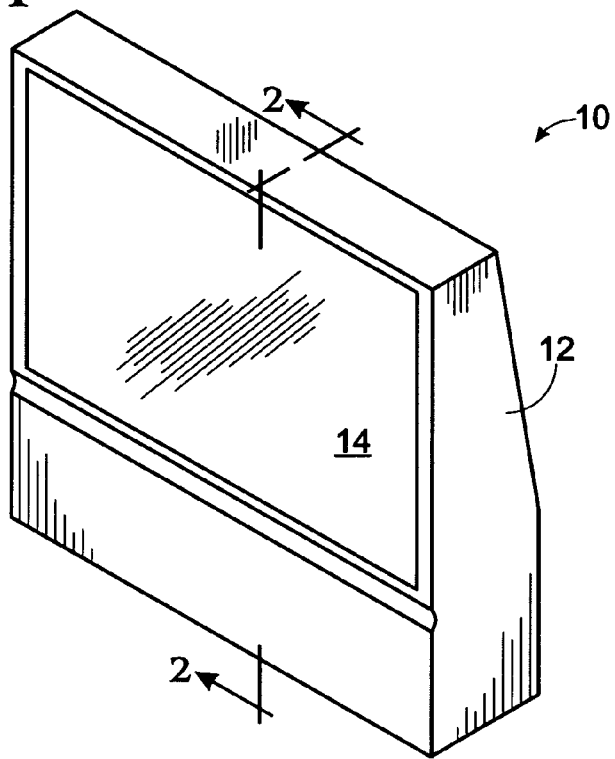
FIG. 1 is an isometric view of a rear projection display system according to a first embodiment of the present invention.
Figure 2:
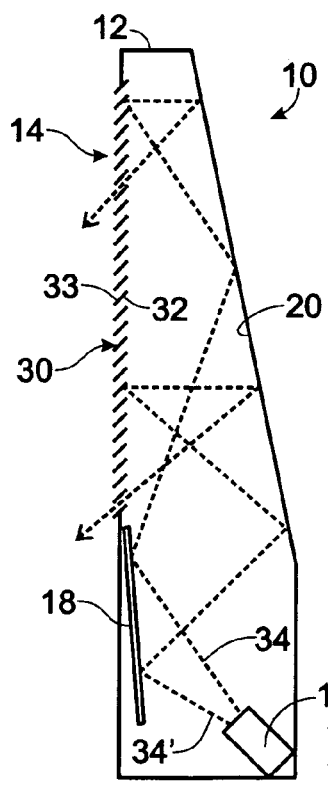
FIG. 2 is a somewhat simplified, sectional view taken along line 2—2 of FIG. 1, showing example paths of light through the system.

One embodiment of a display system according to the present invention is shown generally at 10 in FIGS. 1 and 2 as a rear projection television system. Display system 10 includes a cabinet 12, and a screen 14 that forms at least part of the front surface of cabinet 12. While the various features of the invention are described and illustrated herein in the context of a rear projection television system, it will be appreciated that a display system according to the present invention may take the form of any other desired rear projection display system, large or small.

Referring to FIG. 2, cabinet 12 contains an image source 16 configured to produce an image for display on screen 14. Image source 16 is typically a CRT, LCD or DMD source, but may be any other suitable image source. Image source 16 is configured to project light toward a front mirror 18, which is positioned within cabinet 12 below screen 14. Front mirror 18 is configured to reflect light from image source 12 toward a rear reflector 20, which then reflects the light toward screen 14.

Rear reflector 20 may have any suitable configuration for reflecting light from front mirror 18 toward screen 14. For example, rear reflector 20 may be disposed directly on the rear wall of cabinet 12, or may be spaced from the rear wall. It may be desirable to minimize the space between the rear wall of cabinet 12 and rear reflector 20 to decrease the amount of unused space within cabinet 12, as this may allow cabinet 12 to be constructed with less material. Rear reflector 20 is typically constructed of a stretched sheet of a plastic such as MYLAR® that is coated with a thin layer of aluminum or other metal, but may be made of any other suitable reflective material without departing from the scope of the present invention.

In contrast to conventional rear projection display systems, which have screens that transmit incident light from all angles, screen 14 is configured to have angularly selective, or angularly discriminating, reflective properties. Light incident on screen 14 from some angles is reflected toward rear reflector 20, while light incident on the screen from other angles is transmitted through the screen toward a viewer. Reflecting light off of screen 14 allows the optical path length of display system 10 to be increased without increasing the cabinet depth or weight of the system. Furthermore, the use of an angularly discriminating screen, as opposed to a polarity-discriminating screen, allows the image to be projected with unpolarized light, which generally has double the intensity as polarized light from an equivalent light source.

Screen 14 may utilize any suitable mechanism to achieve its angularly discriminating properties. One suitable mechanism is depicted in FIG. 2 as an array of angularly discriminating reflective elements disposed along the entire vertical dimension of screen 14. Reflective elements 30 take the form of generally planar members that are angularly offset with respect to the vertical plane of screen 14. Each reflective element 30 includes a reflective surface 32 that is oriented to face diagonally downward and toward the inside of cabinet 12. The backside 33 of each reflective element 30 may be darkened to improve the contrast of an image displayed on screen 14. Reflective elements 30 typically extend across the entire width of screen 14, but may have any other suitable width. The spacing between reflective elements 30 is discussed in more detail below.

The operation of reflective elements 30 is illustrated in FIG. 2 with two example rays 34 and 34' of projected light. Upon emission from image source 16, rays 34 and 34' are first reflected from front mirror 18 toward rear reflector 20, and then from the rear reflector in a diagonally upward direction toward screen 14. Due to the orientation of reflective elements 30, light reflected diagonally upward from rear reflector 20 does not pass between reflective elements 30, but instead is reflected by reflective surfaces 32 back toward rear reflector 20, albeit with a shallower upward angle, or even a downward angle, relative to light reflected from front mirror 18. Rear reflector 20 then reflects rays 34 and 34' downwardly toward screen 14 at an angle that allows the rays to pass between adjacent reflective elements 30. Screen 14 may also include a lens array (not shown) to redirect the downwardly transmitted light towards a viewer.

Due to the shape of the cone of light emitted from image source 16, the incident angle of ray 34 on screen 14 may be slightly different than the incident angle of ray 34'. To compensate for small differences in the incident angle of light across the vertical dimension of screen 14, the angle of each reflective element 30 with respect to the screen vertical may change from the top of the screen to the bottom of the screen.

Figure 3:
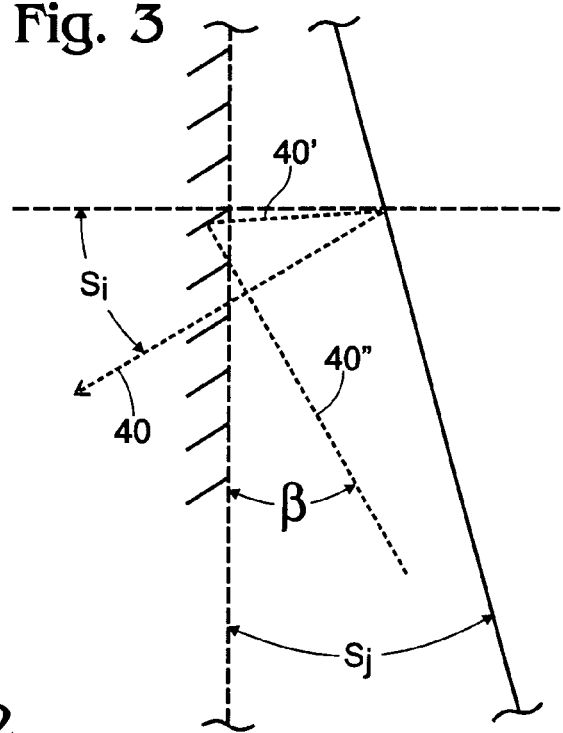
FIG. 3 is a schematic diagram of input and output ray angles relative to the rear mirror and reflective elements.
Figure 4:
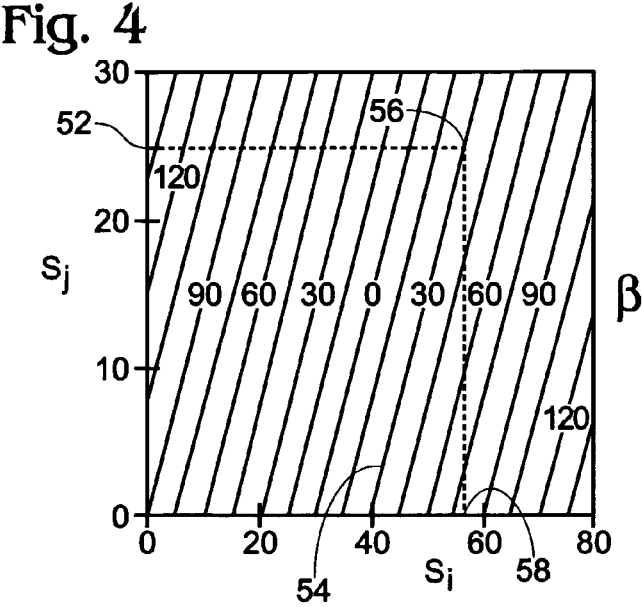
FIG. 4 is a graphical representation of the input ray angle and output ray angle as functions of the rear mirror angle.

The optimal angle of each reflective element 30 relative to the vertical dimension of screen can be calculated for selected rear reflector angles and light input angles by constructing a graph showing the relationship between each of these quantities for a range of system geometries. The geometrical quantities involved in this calculation are illustrated in FIG. 3, and a representative graph is shown in FIG. 4. In FIGS. 3 and 4, the output angle of light (and thus the optimal angle of the reflective elements adjacent the output light ray) is represented by $s_i$ (in degrees), the angle of rear reflector 20 with respect to the vertical dimension of screen 14 is represented by $s_j$, and the input angle of light is represented by $\beta$.

The calculations involve determining the light ray input vector for combinations of selected output vectors and selected rear reflector angles. An example set of calculations is as follows. First, for a selected range of rear reflector angles $s_j$, for example j=0–30, the rear reflector direction vector (normal to the rear reflector surface) is determined.

$$\sigma_j = \begin{pmatrix} -\cos(s_j) \\ -\sin(s_j) \end{pmatrix} \tag{1}$$

In this equation, $\sigma_j$ is the rear reflector direction vector.

Next, for a selected range of reflective element angles $s_i$, for example i=0–80, the output vector (parallel to reflective surfaces 32) is determined.

$$\alpha 1_i = \begin{pmatrix} -\cos(s_i) \\ -\sin(s_i) \end{pmatrix} \quad (2)$$

In this equation, $\alpha 1_i$ is the output vector, represented by output ray 40 in FIG. 4.

Next, these vectors can be used to form reflection matrices that can be used to transform an output vector first to an intermediate vector (represented by intermediate ray 40'), and then to an input vector (represented by input ray 40"), from which the input angle can be calculated. The reflection matrix that transforms the output vector to the intermediate vector is given by:

$$R\sigma_j = \begin{bmatrix} -1 + 2 \cdot [(\sigma_j)_0]^2 & 2 \cdot (\sigma_j)_0 \cdot (\sigma_j)_1 \\ 2 \cdot (\sigma_j)_0 \cdot (\sigma_j)_1 & 1 - 2 \cdot [(\sigma_j)_0]^2 \end{bmatrix} \quad (3)$$

Thus, the intermediate vector, $\alpha 2_{i,j}$, is given by $$\alpha 2_{i,j} = R\sigma_j \cdot \alpha 1_i \quad (4)$$

Similarly, the reflection matrix that transforms intermediate vector to input vector is given by:

$$RL_i = \begin{bmatrix} -1 + 2 \cdot [(L_i)_0]^2 & 2 \cdot (L_i)_0 \cdot (L_i)_1 \\ 2 \cdot (L_i)_0 \cdot (L_i)_1 & 1 - 2 \cdot [(L_i)_0]^2 \end{bmatrix} \quad (5)$$

where $L_i$ is the reflective element direction vector, given by:

$$L_i = \begin{pmatrix} 0 & 1 \\ -1 & 0 \end{pmatrix} \cdot \alpha 1_i \quad (6)$$

Thus, the input vector, $\alpha 3_{i,j}$, is given by:

$$\alpha 3_{i,j} = RL_i \cdot \alpha 2_{i,j} \quad (7)$$

The input angle $\beta$ can then be calculated from the input vector.

$$\cos \beta = (\alpha 3_{i,j})_y \quad (8)$$

where the "y" subscript signifies the y component of the $\alpha 3_{i,j}$ vector.

The calculation of the input vector $\alpha 3_{i,j}$ for the above ranges of i and j yields a plot such as that shown generally at 50 in FIG. 4. When the mirror angle $s_j$ is plotted on the vertical axis and the output angle $s_i$ is plotted on the horizontal axis, each input angle $\beta$ appears as a line extending diagonally across the vertical dimension of plot 50. Using the plot of FIG. 4, the optimal reflective element angle for a selected input angle and mirror angle can be determined simply by locating the selected mirror angle on the vertical axis (for example, twenty-five degrees, as indicated at 52), locating the diagonal for the selected input angle (for example, thirty degrees, as indicated at 54), identifying the point 56 on the plot at which the diagonal for the selected input angle intersects the selected mirror angle, and then locating the optimal reflective element angle 58 on the horizontal axis coordinate corresponding to the point (approximately 55 degrees). Plot 50 may be used in a similar fashion to identify a desired input angle corresponding to selected reflective element and mirror angles, etc.

Figure 5:
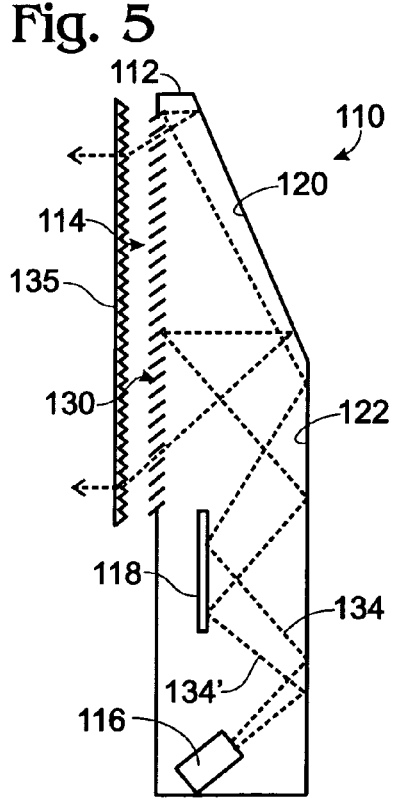
FIG. 5 is a somewhat simplified, sectional view of a second embodiment of a rear projection display system according to the present invention, showing example paths of light through the system.

FIG. 5 shows generally at 110 a second embodiment of a rear projection display system according to the present invention. Like display system 10, display system 110 includes a cabinet 112, and a screen 114 forming at least part of the front portion of cabinet 112. Cabinet 112 contains an image source 116 situated in the bottom portion of the cabinet for projecting an image on screen 114, and a front mirror 118 off of which projected light is reflected between image source 116 and screen 114. Also, screen 114 includes a plurality of angularly offset reflective elements 130 configured to reflect light incident on the screen from a first angle, and to transmit light incident on the screen from a second angle.

In contrast to display system 10, however, rear reflector 120 of the depicted display system 110 has two distinct portions: an upper, angled portion 120 that angles inwardly toward screen 114, and a lower, vertically oriented portion 122. These portions may be part of a single, continuous reflector surface, or may be formed from separate reflectors. Furthermore, image source 116 is configured to project light toward lower rear reflector portion 120, rather than toward front mirror 118. This optical arrangement allows the optical path length within cabinet 12 to be increased without having to significantly increase the depth of display system 110 relative to display system 10, though the height of the cabinet may need to be increased. While lower portion 122 is shown to be vertically oriented in the depicted embodiment, it will be appreciated that the lower portion may have the same angle as upper portion 120, or any other suitable angle, without departing from the scope of the present invention.

FIG. 5 also shows the paths of two example rays of light 134 and 134' through display system 110. Image source 116 projects light toward lower rear reflector portion 122, which reflects the light toward front mirror 118. The light is then reflected off of front mirror 118 back toward lower rear reflector portion 122, from which it is then reflected toward screen 114. Due to the orientation of reflective elements 130, light reflected diagonally upward from lower rear reflector 122 does not pass between reflective elements 130, but instead is reflected toward upper rear reflector portion 120. Upper rear reflector portion 120 then reflects rays 134 and 134' toward screen 114 at an angle that allows the rays to pass between adjacent reflective elements 30. Screen 114 may also include a fresnel lens 135 to redirect the downwardly transmitted light towards a viewer.

As discussed above for reflective elements 30, reflective elements 130 typically extend entirely across screen 114. Furthermore, each reflective element 130 (or reflective elements 30) may be separated from adjacent reflective elements by any suitable spacing. Adjacent reflective elements 130 are generally spaced at a distance of less than or equal to the height of one vertical pixel (typically approximately one millimeter) in the display image.

Figure 6:
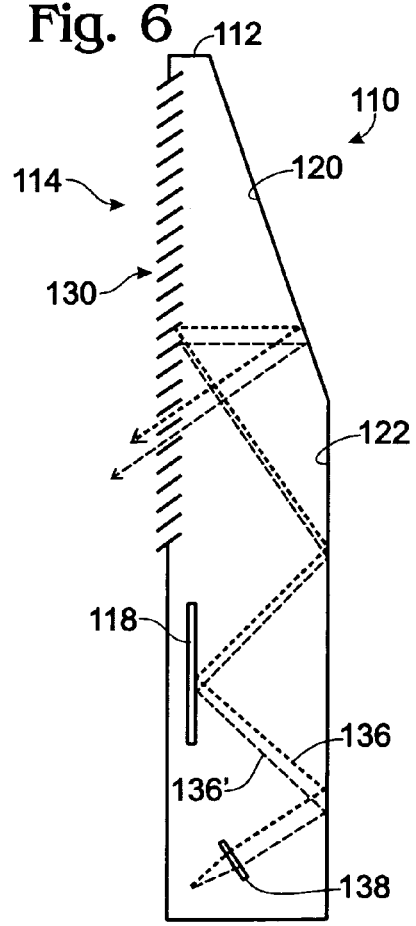
FIG. 6 is a somewhat simplified, sectional view of the embodiment of FIG. 5, showing two rays from a single pixel being reflected from two adjacent reflective elements.

FIG. 6 illustrates the reason for this spacing with two example rays 136, 136' from a single pixel. Rays 136 and 136' originate from the same point, and pass through an optical system, represented by a lens 138, that causes them to converge toward the same pixel on screen 114. However, because rays 136 and 136' are still slightly separated when they first reflect off of screen 114, it is possible that rays 136 and 136' may be reflected off of different reflective elements 130. In this situation, rays 136 and 136' will be transmitted through screen 114 spaced slightly less than the distance between adjacent reflective elements 130, as shown in FIG. 6. Thus, if reflective elements 130 are separated by more than one pixel, light from a selected pixel may be shifted one vertical pixel from its proper location in the image on screen 114, causing blurring in the image. For this reason, it may be preferable to have a spacing of one vertical pixel or less between adjacent reflective elements 130 to reduce image blurring.

Figure 7:
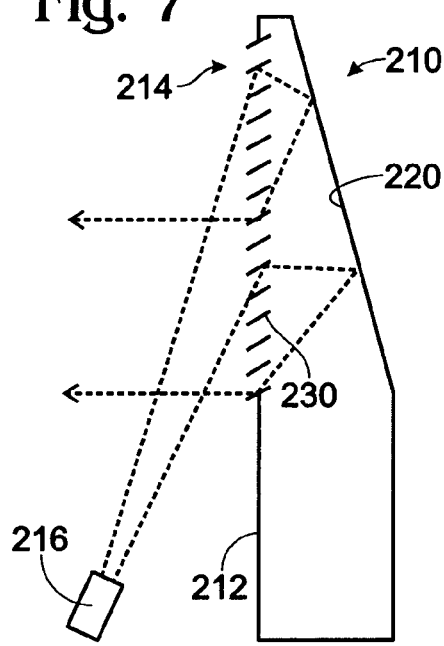
FIG. 7 is a somewhat simplified, sectional view of a third embodiment of a rear projection display system according to the present invention, showing example paths of light through the system.

FIG. 7 shows generally at 210 a third embodiment of a rear projection display system according to the present invention. Like display systems 10 and 110, display system 210 includes a cabinet 212, a screen 214, an image source 216 and a rear reflector 220. However, unlike display systems 10 and 110, image source 216 of display system 210 is positioned outside of cabinet 212, rather than within the cabinet. This placement of the image source may allow the cabinet to be made even thinner, potentially reducing weight and materials costs.

Screen 214 includes a plurality of reflective elements 230 configured to reflect incident light from image source 216 onto rear reflector 220. Rear reflector 220 reflects the light back toward screen 214, which then transmits the light to display the projected image to a viewer. Reflective elements 230 may be configured to redirect light from rear reflector 220 from a downwardly direction to a more horizontal direction, as shown in FIG. 7, or may be configured to transmit light from rear reflector 220 without redirecting the light. Where light reflected from rear reflector 220 is not redirected by reflective elements 230, a fresnel lens such as that shown in FIG. 5 may be used to redirect the light. Reflective elements 230 may be configured to reflect light in either direction via ordinary reflection, or by total internal reflection.

Figure 8:
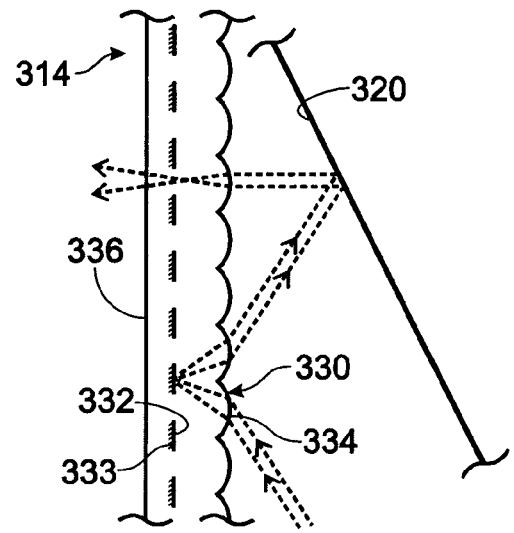
FIG. 8 is a schematic representation of a second alternate configuration of reflective elements.

FIG. 8 shows generally at 330 a second configuration of reflective elements suitable for use in a display system according to the present invention. As with reflective elements 30, reflective elements 330 each include a reflective surface 332 configured to reflect incident light toward a rear reflector 320. Each reflective surface 332 is spaced somewhat from adjacent reflective surfaces. Thus, a ray of light encountering the screen 314 may either pass between reflective surfaces 332, or be reflected from a reflective surface 332, depending upon how the light is directed onto the screen. However, in contrast to reflective elements 30, reflective elements 330 are arranged in a generally coplanar relation to one another along the vertical plane of screen 314. Furthermore, each reflective element 330 also includes a lens 334 positioned between rear reflector 320 and reflective surface 332 to selectively direct light either onto or between reflective surfaces 332.

As depicted in FIG. 8, lenses 334 are configured to focus light incident on screen 314 from a first, more upwardly-angled direction onto a corresponding reflective surface 332. This light is reflected by reflective surface 332 toward rear reflector 320, from which it is reflected back toward screen 314 in a second, more horizontal direction. Light from the second direction is focused by each lens 334 between reflective surfaces 332 so that the light is transmitted through screen 320 and out a diffusing screen surface 336. While the first incident angle of light is shown to be a diagonally upward angle, and the second is shown to be more perpendicular to screen 314, it will be appreciated that the screen may be configured to selectively reflect or transmit incident light from any desired angle by modifying the shape and/or position of lenses 334 relative to reflective surfaces 332.

Reflective surfaces 332 and lenses 334 may have any suitable shape and size. Typically, each reflective surface 332 and lens 334 will extend across the entire width of screen 314, and will have a height of less than or equal to one vertical pixel to avoid the blurring problems described above. Furthermore, the shapes and positioning of the reflective surfaces 332 and lenses 334 may change across the vertical and/or horizontal dimension of the screen to correct for differences in incident angles caused by the shape of the cone of light emitted by the image source. Additionally, reflective elements 330 may have a darkened back surface 333 to improve screen contrast.

Figure 9:
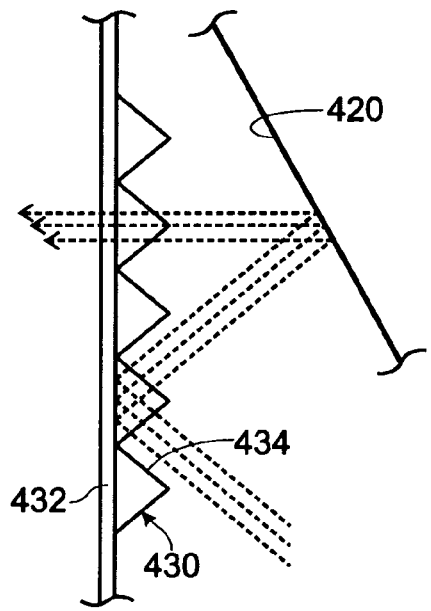
FIG. 9 is a schematic representation a third alternate configuration of reflective elements.

FIG. 9 shows generally at 430 a third alternate configuration of reflective elements suitable for use in a display system according to the present invention. Reflective elements 430 take the form of small, pyramidal prism elements 430 that selectively reflect incident light via total internal reflection. Prism elements 430 are mounted to a flat, transparent or translucent surface 432 that is made of a material with a lower refractive index than the reflective elements. All incident light that encounters surface 432 at an angle equal to or less than the critical angle for total internal reflection is reflected away from surface 432. The pyramidal shape of the depicted prism elements 430 allows reflected light to exit the prism element from a back face 434 without internal reflection.

Internally reflected light is directed toward a rear reflector 420, from which it is reflected back toward prism elements 430. However, rear reflector 420 reflects light back toward prism elements 430 which results in an angle greater than the critical angle of the interface between the prism elements and surface 432. Thus, light that is reflected off of rear reflector 420 is transferred through the screen for display to a viewer without an appreciable degree of internal reflection.

While prism elements 430 depicted in FIG. 9 are pyramidal in cross-section, the prism elements may have any other suitable shape and size. Typically, each prism element 430 extends completely across the width of the screen, and has a height approximately the same as, or less than, a single vertical pixel to avoid the above-described distortion problems. Furthermore, while prism elements 430 of the embodiment depicted in FIG. 9 have generally flat sides, the prism elements may also have a convex, concave or other shaped surface to function as a lens. Also, the angles and/or shapes of each side of each prism element 430 may be chosen for optimum transmittance of light through the prism element, which occurs when light enters or leaves a prism element in a direction normal to the side of the prism element. Furthermore, the shape of each prism element may be configured to direct the light through a horizontal black stripe pattern on the outside of surface 432 that increases the contrast.

Because light from the image source may reach the screen at a range of different angles across the vertical dimension of the screen, as described above, the prism elements may be configured to vary in shape from the top to the bottom of the screen for maximum transmittance. If desired, diffractive optics can be applied at the surfaces of each prism element for optical correction of chromatic aberrations.

Figure 10:
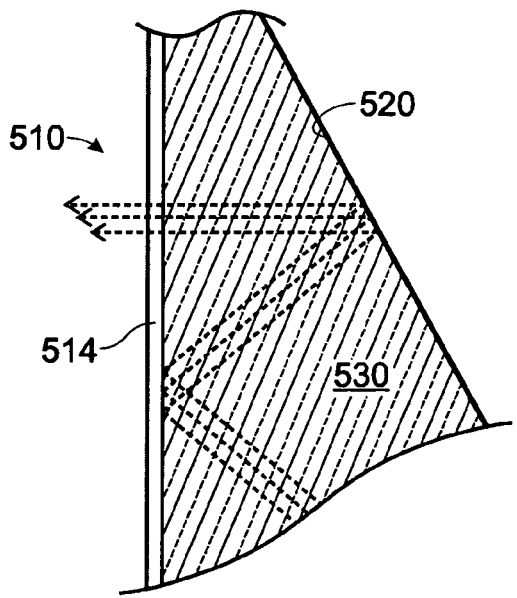
FIG. 10 is a schematic representation of a fourth alternate configuration of a reflective element.

FIG. 10 shows a screen 514 and a rear reflector 520 from another rear projection display system 510 that utilizes total internal reflection to selectively reflect or transmit light incident on the screen as a function of the angle of incidence of the light. As opposed to the embodiment in FIG. 9, display system 510 does not employ individual prism elements to internally reflect light incident on the screen toward the rear reflector. Instead, the space between screen 514 and rear reflector 520 of display system 510 is completely filled with a material 530 having a higher index of refraction than screen 514. Thus, all light incident on screen 514 at an angle shallower than the critical angle will be reflected toward rear reflector 520. Likewise, light incident on screen 514 at angles greater than the critical angle will be at least partially transmitted through screen 514. To maximize the transmission of light through screen 514, it may be desirable to configure rear reflector 520 to reflect light toward the screen in a direction normal to the plane of the screen.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

We claim:

1. A rear projection display system, comprising:
   an image source for projecting an image;
   a rear reflector; and
   a screen configured to display to projected image, wherein the screen includes a plurality of reflective elements configured to angularly discriminate light without regard to polarity by reflecting light incident on the screen from a first angle toward the rear reflector, and to allow light incident on the screen from a second angle to be transmitted through the screen for display;
   wherein the rear reflector is spaced from the screen.

2. The rear projection display system of claim 1, wherein each reflective element includes a reflective surface, each reflective surface being spaced apart from adjacent reflective surfaces.

3. The rear projection display system of claim 2, wherein each reflective surface is generally coplanar with the adjacent reflective surfaces.

4. The rear projection display system of claim 3, wherein each reflective elements includes a lens positioned adjacent the reflective surface, the lens being configured to direct light incident on the screen from the first angle onto the reflective surface and to direct light incident on the screen from the second angle between adjacent reflective surfaces.

5. The rear projection display system of claim 2, further comprising a casing, wherein the image source is positioned outside of the casing.

6. The rear projection display system of claim 2, the screen including plurality of vertical pixels, each of the vertical pixels having a height, wherein each reflective surface is spaced from adjacent reflective surfaces by a distance equal to or less than the height of the vertical pixels.

7. The rear projection display system of claim 1, wherein the plurality of reflective elements includes a plurality of prism elements configured to internally reflect light incident on the screen from the first angle toward the rear reflector, and to transmit light incident on the screen from the second direction.

8. The rear projection display system of claim 7, each of the prism elements having a height and the screen having a plurality of pixels, each pixel having a height, wherein the height of the prism elements are less than or equal to the height of the pixels.

9. The rear projection display system of claim 7, wherein each of the prism elements has a generally pyramidal cross-sectional shape.

10. The rear projection display system of claim 1, the screen having a width, wherein each of the reflective elements extends across the width of the screen.

11. The rear projection display system of claim 1, wherein each of the reflective elements includes a front side and a back side, the front side being reflective and the back side having a dark coloration for improved contrast.

12. A rear projection display system for displaying an image to a viewer, the rear projection display system having a front side and a back side and comprising:
    an image source configured to project an image;
    a rear reflector disposed against the back side of the display system; and
    a selectively reflective screen disposed against the front side of the display system, the screen including a plurality of reflective elements configured to reflect light incident on the screen from an upward direction toward the rear reflector and to transmit light incident on the screen from a downward direction between the reflective elements.

13. The rear projection display system of claim 12, wherein each reflective element includes a total internal reflection element configured to internally reflect incident light from the upward direction toward the rear reflector and to transmit incident light from the downward direction toward the viewer.

14. The rear projection display system of claim 13, wherein the total internal reflection element includes a prism.

15. A rear projection display system, comprising:
    a screen configured to display an image to a viewer;
    an image source configured to project the image; and
    a rear reflective surface configured to reflect light from the image source onto the screen,
    wherein the screen includes a plurality of generally planar, spaced-apart reflective elements oriented with respect to a vertical plane of the screen such that incident light from the image source is first reflected from the reflective elements toward the rear reflective surface and then reflected from the rear reflective surface toward the screen for transmission between the reflective elements; and
    wherein the rear reflective surface is spaced from the screen.

16. The rear projection display system of claim 15, the screen having a plane and the reflective elements having generally planar reflective surfaces, wherein the reflective surfaces are angularly offset from the plane of the screen.

17. The rear projection display system of claim 15, the reflective elements having generally planar reflective surfaces, wherein the reflective surfaces are parallel to one another.

18. The rear projection system of 15, the screen having a plane, wherein the reflective elements change angle with respect to the plane of the screen from top to bottom.

19. A rear projection display system, comprising:
an image source;
a rear reflective surface;
a screen, the screen including a lens array; and
a mirror array positioned adjacent to and coplanar with the lens array, wherein the lens array includes a plurality of lenses configured to direct light incident on the screen from a first angle onto the mirror array to be reflected toward the rear reflective surface, and wherein the screen is configured to direct incident light from a second angle through the screen for display to a viewer;
wherein the rear reflective surface is spaced from the screen.

20. An image display device, comprising
a light source for projecting light;
a rear reflective surface; and
a plurality of reflective elements configured to angularly discriminate light, wherein light incident on the plurality of reflective elements from a first angle is reflected toward the rear reflective surface, and light incident on the plurality of reflective elements from a second angle is transmitted through the plurality of reflective elements;
wherein the rear reflective surface is spaced from the screen.

21. The image display device of claim 20, wherein the light source is an image source and the light projected from the image source is an image.

22. The image display device of claim 21, further comprising a screen disposed adjacent to the plurality of reflective elements, wherein the screen is configured to display the projected image.

23. The image display device of claim 20, wherein each reflective element includes a reflective surface, each reflective surface being spaced apart from adjacent reflective surfaces.

24. The image display device of claim 23, wherein each reflective element includes a lens positioned adjacent the reflective surface, the lens being configured to direct light incident on the plurality of reflective elements from the first angle onto the reflective surface and to direct light incident on the plurality of reflective elements from the second angle between adjacent reflective surfaces.

25. The image display device of claim 20, wherein the plurality of reflective elements includes a plurality of prism elements configured to internally reflect light incident on the plurality of reflective elements from the first angle toward the rear reflective surface, and to transmit light incident on the plurality of reflective elements from the second direction.

* * * * *